UNITED STATES PATENT OFFICE.

HENRY P. WEBB, OF BROOKLYN, NEW YORK.

IMPROVEMENT IN PAINTS FOR FILLING THE SEAMS OF VESSELS.

Specification forming part of Letters Patent No. 221,882, dated November 18, 1879; application filed November 15, 1878.

*To all whom it may concern:*

Be it known that I, HENRY P. WEBB, of the city of Brooklyn, and county of Kings, and State of New York, have invented a new and useful Compound, forming a cement seam-paint, which compound is fully described in the following specification.

The nature and object of this invention is to provide a preparation for filling the seams of wooden vessels after having been calked with oakum or any other like substance.

It is a well-known fact that in the use of pitch or ordinary linseed-oil paints for seam-painting great difficulties occur, some of which are as follows: Common pitch is liable to crack and drop out of the seams in extremely cold climates, leaving the oakum bare, and in hot climates it becomes heated and leaves the seams, defacing the sides of ships. When linseed-oil paints are used—such as white or red lead, or any of the well-known pigments—another objection presents itself. When the oakum in the seams of vessels is well covered or the seams filled the paint soon becomes very hard, and in case the planks shrink the paint does not swell correspondingly. The seam is thus not kept tight, and leaks are caused. It is also well known that linseed-oil is objectionable, because it is in its nature heating and tends to burn the oakum.

In order to obviate these difficulties and objections and others, I have invented a cement seam-paint which will preserve oakum or wood, will fill the seams partially or wholly, is elastic and water-proof, will not crack or melt, and will expand and contract with the swelling or shrinking of the vessel's planks in the various climates.

The nature of my invention consists in the union of a quick-drying gum made of resin and its solvent with an earthy base and with cement; and I here state the process and materials by which I can accomplish the best results:

First, I heat in a kettle of suitable size about forty pounds of common resin slowly until quite thin, nearly as thin as water. I then draw the fire, and add, while hot, thirty-five gallons of naphtha (petroleum naphtha preferred) slowly, taking great care to stir all the time. This I let stand until cold, which produces about thirty-five gallons of a varnish-like gum. I then take a large vessel and place in it, say, two hundred and fifty pounds of any earthy pigment or base which has a good body, such as red oxide of iron (made by burning ores) or ochers, and mix with the above about thirty gallons of the liquid above described. After this is well mixed I add twenty-five pounds of any well-known hydraulic cement, such as Rosendale or Portland cement, and again thin with naphtha to a consistency which will allow it to be applied with an ordinary seam-brush. The composition is then ready for use, and will dry quickly; but if an extra quick-drying composition is required I add to the gum before mixing it with the base about twenty gallons of ordinary Japan drier, thinning again, if necessary, with sufficient naphtha to make it mix.

This composition is to be canned and hermetically sealed immediately, for when left open to the air it dries rapidly and becomes nearly solid, though elastic. It can be applied to the seams of vessels with a seam-brush or a shell, such as is used with pitch.

The above quantities may be considerably varied, producing results of greater or less degree of excellence.

Spirits of turpentine or any other diluent may be substituted in place of naphtha.

What I claim as new is—

1. A compound for filling the seams of vessels, consisting of a quick-drying liquid-gum vehicle composed of resin and its solvent, combined with an earthy base and with a hydraulic cement, substantially in the manner and for the purpose described.

2. A compound for filling the seams of vessels, consisting of a quick-drying liquid-gum vehicle composed of resin and naphtha, combined with red oxide of iron and Portland cement, substantially in the manner and for the purpose specified.

HENRY P. WEBB.

Witnesses:
GEO. M. BAKER,
JOHN C. PORTLEY.